July 19, 1955 E. B. WEST 2,713,327
TETHERING DEVICE
Filed Oct. 26, 1953
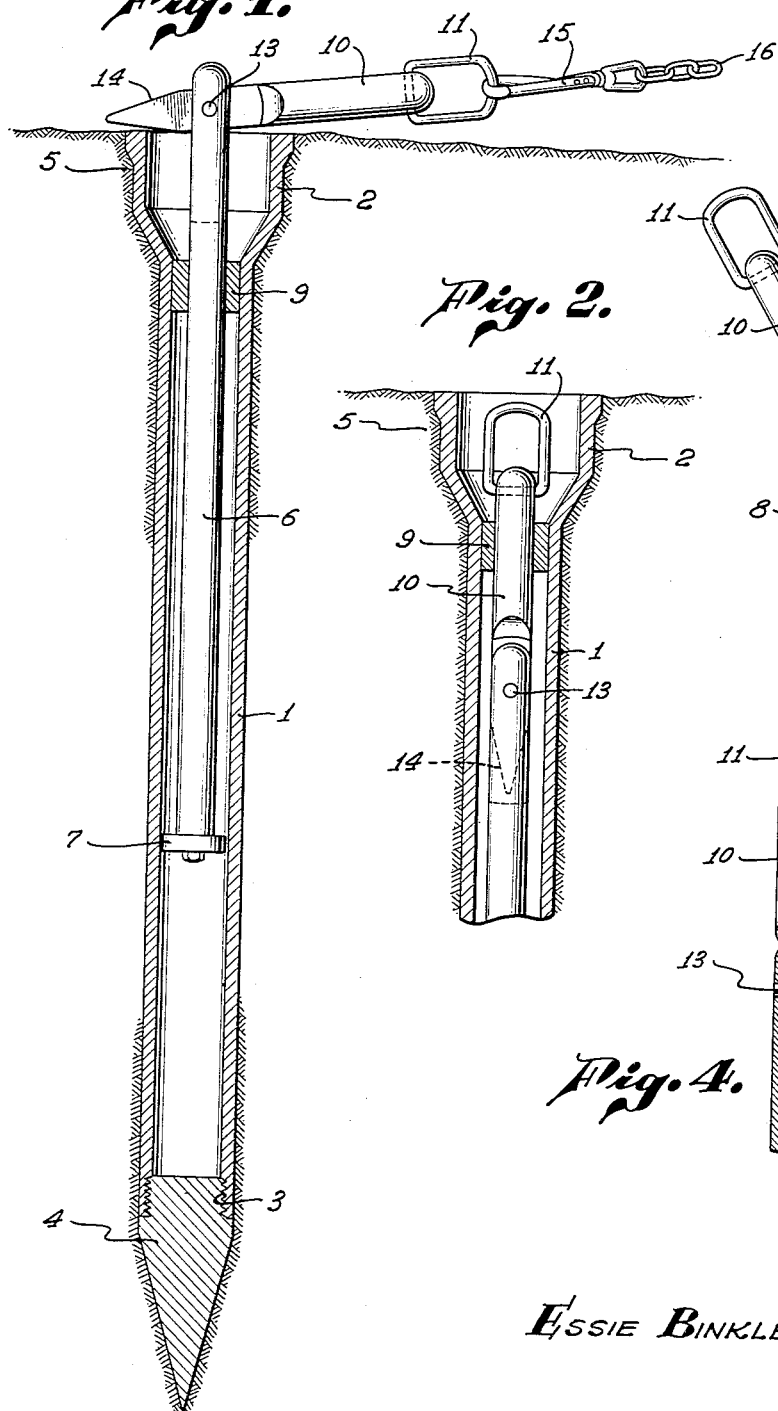
Essie Binkley West,
INVENTOR.
BY
Attorney.

United States Patent Office 2,713,327
Patented July 19, 1955

2,713,327

TETHERING DEVICE

Essie Binkley West, Glendale, Calif.

Application October 26, 1953, Serial No. 388,259

1 Claim. (Cl. 119—125)

The present invention relates to tethering devices, and has for an object the provision of a device which may be installed within a yard or other location for the tethering of dogs or other small animals.

A further object is the provision of a tethering device which, when not in use, offers no surface obstruction.

A further object is the provision of a tethering device to which a leash of some type may be secured, and which leash, when so secured, will be free for movement in any direction without entanglement.

With respect to the foregoing object, it is customary to secure a dog, cat, or other small animal by means of a leash to a post, and the animal often runs around the post, gradually shortening the length of the leash and entangling the same.

The present invention contemplates a device which is so constructed as to effectively hold a leash while allowing the dog or other small animal to play without shortening the length of the leash.

A further object of the invention is the provision of a tethering device which may hold various instrumentalities within a casing, and still allow said instrumentality to be readily accessible when use thereof is desired.

In its simplest embodiment, the present invention includes a casing which may be placed within the ground, with the upper end thereof exposed at the surface of the ground, and which casing is adapted to house a ring which may be secured to one end of a tethering device. The ring is positively held within the casing when the tethering device is not in use.

Other objects include a tethering device which is inexpensive in cost of manufacture, and generally superior to devices for a like purpose now known to the inventor.

With the above mentioned and other objects in view, the invention consists in the novel and useful provision, formation, construction, association, and relative arrangement of parts, members and features, all as shown in one embodiment in the accompanying drawing, described generally, and more particularly pointed out in the claim.

In the drawing:

Figure 1 is a vertical sectional elevation of the tethering device as an entirety, and shown within the ground, Figure 2 is a fragmentary sectional view of the tethering device, certain parts being in changed relationship from that of Figure 1.

Figure 3 is a fragmentary view, partly in section, showing two members of the tethering device, and, Figure 4 is a sectional view on the line 4—4 of Figure 3.

Referring now with particularity to the drawing, I have provided a casing 1 of tubular form, the upper end of which is enlarged as to diameter or flared as shown at 2, and the lower end of which is internally threaded at 3 to receive the shank of a conical member 4. It is intended that the casing should be driven into the ground, the ground being indicated at 5, in such a manner and to such a position that the open end of portion 2 is substantially flush with the surface of the ground, or to such position that the rim does not provide any obstruction at the surface of the ground. Adapted for telescopic movement within the casing is an elongated rod 6, the lower end of which carries a disk 7 while the upper end of said rod is bifurcated at 8. The rod 6 is adapted to pass through a collar or bushing 9, which bushing is positioned in the casing below the flared or enlarged diameter portion 2 thereof. As the rod is adapted for movement within the casing and outward therefrom, the bushing or collar, together with the disk 7, act in the dual capacity of guiding movement of the rod 6 and limiting outward movement thereof. A short length rod 10 carries at one end a ring 11 while the opposite end of the rod 10 is reduced in thickness, as shown at 12, and provided with parallel flat side faces. This reduced portion is received between the furcations 8 and pinned thereto by pin 13. Portion 12 is provided with tapered sides, as shown at 14.

The operation, uses and advantages of the invention just described are as follows:

After the casing 1 has been placed within the ground, as shown in both Figures 1 and 2, the user of the device may snap the catch 15 to the ring 11 while the device is still within the ground and the parts are in the position shown in Figure 2. The catch, with its associated chain 16, may be pulled upwardly, which will raise the two rods 6 and 10 vertically within the casing with the tapered end 14 of the bar 10 above the mouth or rim of the portion 2 of the casing. Upon the rod 10, assuming an angularity relative to the rod 6, in the manner shown in both Figures 1 and 3, the tapered end of rod 10, together with the remaining portion of the rod 10, will diametrically span the mouth of portion 2 of the casing, the weight of the rod 6 maintaining the transverse position of the rod 10. As shown, the tapered edges of end 14 will incline the rod slightly, and any animal tethered to the chain, may run in different directions, the rod 6 turning within the casing 1 without any entanglement of the chain with the tethering device.

When use of the tethering device is no longer necessary, the snap catch 15 may be released from the ring 11, a pull exerted upwardly upon the ring to lift the rod 6 upwardly, whereupon rod 10 may be swung into axial alignment with the rod 6, and the device dropped within the flared or enlarged diameter portion 2 to house the rod 10 and the ring 11 below the surface of the ground.

If desired, a detachable cap may be provided for member 2, to prevent dirt and other extraneous material from being received therein. However, the fit between the rods 6, 10, and the collar or bushing is such as to effectively keep debris from entering the casing 1 and impeding any movement of the rods therein.

I claim:

In a tethering device, a casing having a uniform diameter tubular portion, a flared, extended upper end portion, and a conical lower end portion; a cylindrical rod for longitudinal and rotary movement within said casing, a disc carried by the lower end of said rod, a bushing positioned in the tube adjacent the flared upper end portion of the casing and through which bushing the said rod is passed, the said bushing and the said disc guiding movement of the rod relative to the casing, and a second rod pinned intermediate its ends to the first rod to permit the second rod to move into axial alignment with the first rod or to assume an angular relationship to the axis of the first rod, said second rod, when in angular relationship, diametrically spanning the open end of said flared upper end.

References Cited in the file of this patent

UNITED STATES PATENTS 519,891   Muth _____ May 15, 1894